United States Patent Office 3,201,366
Patented Aug. 17, 1965

---

3,201,366
STABILIZATION OF POLY(VINYL ISOPROPYL ETHERS) WITH A BENZOTRIAZOLE AND A PHENOL
Frank A. Magnotta, Lancaster, Pa., assignor to Air Reduction Company, Incorporated, New York, N.Y., a corporation of New York
No Drawing. Filed July 13, 1960, Ser. No. 42,518
3 Claims. (Cl. 260—45.8)

This invention relates to the stabilization of polymers of vinyl lower alkyl ethers and is more particularly concerned with stabilized poly(vinyl lower alkyl ethers), especialy poly(vinyl isopropyl ether), and to stabilizer systems effective for such stabilization.

Vinyl lower alkyl ethers tend to deteriorate in the presence of light and heat. Upon exposure to light and heat, especially in solution, these polymers, particularly those of high molecular weight, become discolored and degraded. In some cases, unstabilized solid polymers, even when treated for the removal of catalyst residues or purified by reprecipitation from solvents, have been transformed over a period of weeks or months at room temperature into balsam-like or liquid products. This breakdown is accelerated not only by heat and light but by small amounts of acidic compounds which act as polymerization catalysts at low temperature. The degradation products may include alcohol, aldehydes and sirupy low polymers. Polymers of vinyl isopropyl ether are particularly susceptible to such deterioration and degradation. Efforts in the prior art to improve stability of poly(vinyl lower alkyl ethers) have not been entirely satisfactory. Improvements obtained in the past with known stabilizers have been very limited, falling short of the desired degree of stability.

It is an object of the present invention to provide stabilized polymers of vinyl lower alkyl ethers, more particularly stabilized amorphous vinyl isopropyl ether polymers.

It is another object of the invention to provide a process for stabilizing vinyl lower alkyl ether polymers against deterioration and degradation, particularly under the influence of heat and light.

It is a further object of the invention to provide a new stabilizer system for polymerized vinyl lower alkyl ethers which is of particularly utility in stabilizing high molecular weight polymers of vinyl isopropyl ether.

In accordance with the invention, poly(vinyl lower alkyl ethers) are effectively stabilized by incorporating in them a stabilizer system consisting of 2,6-di-t-butyl-4-methylphenol and a phenyl-substituted benzotriazole of the formula

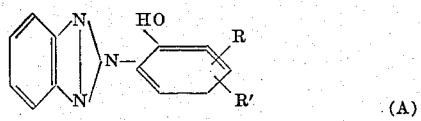

(A)

wherein R and R' are lower alkyl radicals particularly methyl and tert-butyl radicals.

At least 0.25% by weight of the two components of the stabilizer system per part of polymer being stabilized is employed and preferably at least 0.5% by weight of each component is used. Advantageously, equal amounts of each component are used but the ratio of the two components may range from 2:1 to 1:2. Generally speaking, 1% by weight of each component is sufficient for all practical purposes and greater quantities serve no useful purpose, but such greater quantities may, of course, be used, e.g., up to 5% by weight of each component. Expressed in terms of preferred quantities, therefore, the 2,6-di-tert-butyl-4-methylphenol is used in the amount of 0.5 to 1% by weight of the polymer and the phenyl-substituted benzotriazole is similarly used in the amount of 0.5 to 1% by weight of the polymer.

Since poly(vinyl lower alkyl ethers) of high molecular weight are generally solids, and since even such polymers of low molecular weight are viscous liquids, the two stabilizer components of the invention are preferably incorporated with the polymer in solution. Thus, in a typical procedure, the polymer to be stabilized, e.g., poly(vinyl isopropyl ether) is dissolved in an inert solvent to form a relatively fluid solution, the stabilizer components are dissolved in the solution and mixed in it until a homogeneous mixture is formed, and then the solvent is evaporated to leave the polymer with the stabilizer components homogeneously distributed in it.

An inert solvent may be used for this purpose such as ethers, e.g., diethyl ether, ketones, such as acetone, or chlorinated hydrocarbons such as carbon tetrachloride, but hydrocarbon solvents such as aromatic solvents, e.g., benzene, or aliphatic solvents, e.g., pentane or hexane, are preferred. The solvent is preferably liquid at room temperature but has a boiling point not too greatly removed from room temperature so that it can be removed from the polymer without unduly heating it or requiring a high vacuum. Thus an inert solvent having a boiling point between 25° C. and 85° C. is preferably employed. The concentration of the solution may vary, e.g., a solids content of 50–70% by weight, as long as the solution is sufficiently fluid to permit the desired mixing. The stabilizer components are suitably dissolved in a small amount of the solvent before being added to the main solution to facilitate uniform distribution.

It has been discovered that the two-component stabilizer system described above involves a synergistic action between the two components so that the two components in combination have a stabilizing activity not obtainable with an equal quantity of either component alone. It has been found, for example, that poly(vinyl lower alkyl ethers) can be stabilized by the use of the stabilizer system of this invention for more than 66 hours while under continuous ultra-violet radiation at 66° C. and while exposed to temperatures of 100° C.

Poly(vinyl lower alkyl ethers) are known polymers having a wide variety of uses which can be produced by known processes, such as those described on pp. 598–606 of "Vinyl and Related Polymers," by Calvin E. Schildknecht, John Wiley and Sons, New York, 1952.

The stabilized poly(vinyl lower alkyl ethers) produced in accordance with this invention are adapted for all of the purposes for which poly(vinyl lower alkyl ethers) are commonly employed, and they are particularly useful for adhesives and rocket fuel binders.

For purposes of illustration of the invention, a poly(vinyl isopropyl ether) was prepared as follows:

Two hundred grams of isopropyl vinyl ether and 260 ml. of pentane were placed in a 2-liter reaction kettle which was equipped with a thermometer and stirrer. An ample water-cooled condensing surface was provided. The stirrer was started and the kettle contents were stirred vigorously.

There were then added three portions each of 0.25 ml. of catalyst consisting of a 2% solution of boron fluoride ethyl ether in chloroform. After a short induction period, a vigorous exothermic reaction occurred which subsided in about ten minutes and refluxing stopped after about ten minutes. The initial vigorous refluxing temperature was in the range of 41° C.–42° C. As the monomer was used up, the temperature of the kettle contents dropped gradually to 37° C.–38° C., at which time refluxing ceased. The kettle contents were allowed to cool until they reached 30° C.–33° C., then they were removed. The yield was essentially quantitative; the residual monomer content was below 1%.

A series of test samples were then prepared, each consisting of 10 grams of a solution of the poly(vinyl isopropyl ether) prepared as described above in pentane, the solution having a 57% by weight solids content, to which were added varying quantities of 2,6-di-t-butyl-4-methylphenyl (Stabilizer 1) and of 2(2'-hydroxy-3',5'-dimethyl phenyl) benzotriazole (Stabilizer 2).

The polymer samples were prepared by weighing the pentane solution of the polymer into 2 oz. jars and then adding the desired quantities of the two stabilizer components each of which had previously been dissolved in 20 cc. of pentane and the stabilizer solutions were intimately mixed with the polymer solution until homogeneous. The pentane was then evaporated from the solution in each jar and the polymeric residue was vacuum dried at 1 mm. (Hg) for approximately 7 hours at room temperature.

The test samples thus prepared were then subjected to exposure to ultra-violet light at 66° C. for 66 hours or to air at a temperature of 100° C. for varying periods.

The procedure for testing with ultra-violet light was that described in ASTM Standards, Part 6, p. 353 (1955), D 620–49. The apparatus consisted of a reflector equipped with a sun lamp, the samples being mounted upon a turn-table.

The air aging test at 100° C. was carried out in an automatic controlled air circulating oven maintained at 100° C.

The table below sets forth the pertinent data regarding the stabilizer content of the test samples, the nature of the test, and the observations which were made. The relative coloring changes were observed visually.

Table

| Sample No. | Stabilizer and Quantity by wt. | Test Type | Observations |
|---|---|---|---|
| a | Stabilizer 1—1% | Ultra-Violet | Yellow color. |
| b | Stabilizer 2—1% | ___do___ | Do. |
| c | None | ___do___ | Dark yellow color. |
| d | Stabilizer 1—1%; Stabilizer 2—1%. | ___do___ | Colorless. |
| e | Stabilizer 1—½%; Stabilizer 2—½%. | ___do___ | Do. |
| f | None | Air Heat—100° C. | Turned yellow after 2 hrs. |
| g | Stabilizer 1—1% | ___do___ | Colorless for 8 hrs.; yellow with brown spots after 24 hrs. |
| h | Stabilizer 2—1% | ___do___ | Turned yellow after few minutes. |
| i | Stabilizer 1—2% | ___do___ | Yellowed after 2½ hrs. |
| j | Stabilizer 1—1%; Stabilizer 2—1%. | ___do___ | Colorless for 8 hrs., light yellow after 24 hrs., no spots. |

It will thus be seen that the stabilizer system of the present invention consists of stabilizer components which exhibit a synergistic action and the two components in combination have an activity which is not exhibited by either component alone. By the use of this stabilizer system, highly stable poly(vinyl lower alkyl ethers) can be prepared.

It will be understood that various changes and modifications may be made without departing from the scope of the invention as defined in the appended claims and it is intended, therefore, that all matter contained in the foregoing description shall be interpreted as illustrative only and not as limitative of the invention.

I claim:

1. A stabilized poly(vinyl isopropyl ether) comprising poly(vinyl isopropyl ether), from 0.5% to 1% by weight of said poly(vinyl isopropyl ether) of the stabilizer-2,6-di-tert-butyl-4-methylphenol, and from 0.5% to 1% by weight of said poly(vinyl isopropyl ether) of the stabilizer - 2(2'-hydroxy-3',5' - dimethylphenyl) benzotriazole.

2. A stabilized poly(vinyl isopropyl ether) according to claim 1, wherein each stabilizer comprises 0.5% by weight of said poly(vinyl isopropyl ether).

3. A stabilized poly(vinyl isopropyl ether) according to claim 1, wherein said stabilizers are present in equal amounts by weight.

References Cited by the Examiner

UNITED STATES PATENTS 2,866,775  12/58  Sellers _____ 260—45.95
2,922,778  1/60   Rife et al. _____ 260—45.95
2,994,681  8/61   Hammon et al. _____ 260—45.95
3,004,896  10/61  Heller et al. _____ 260—45.8

LEON J. BERCOVITZ, *Primary Examiner.*

ALPHONSO D. SULLIVAN, MILTON STERMAN,
*Examiners.*